United States Patent [19]

Friedrichs et al.

[11] 4,053,266

[45] Oct. 11, 1977

[54] PROTECTIVE HOOD FOR PELLETING PRESSES

[75] Inventors: Konrad Friedrichs; Jürgen Hinzpeter; Walter Braüner, all of Schwarzenbek, Germany

[73] Assignee: Fa. Wilhelm Fette GmbH, Schwarzenbek, Germany

[21] Appl. No.: 683,594

[22] Filed: May 5, 1976

[30] Foreign Application Priority Data

May 9, 1975 Germany ............................ 2520691

[51] Int. Cl.[2] .............................................. B29C 3/00

[52] U.S. Cl. ...................................... 425/73; 425/151; 425/352; 425/211

[58] Field of Search ................. 425/73, 151, 210, 211, 425/352, 353, DIG. 230; 249/204

[56] References Cited

U.S. PATENT DOCUMENTS 2,068,619 1/1937 Bailey .................................. 425/353
2,254,262 9/1941 Bratring ............................ 425/73 X
2,912,716 11/1959 Frownfelter et al. ............. 425/73 X
3,555,730 1/1971 Brink ............................... 425/352 X

OTHER PUBLICATIONS

Doughnut Corporation of America (Publication).

*Primary Examiner*—Robert L. Spicer, Jr.
*Attorney, Agent, or Firm*—Sughrue, Rothwell, Mion, Zinn and Macpeak

[57] ABSTRACT

A protective hood for a tablet compressing machine includes a heavy cover plate 12 resiliently supported on the top of the machine frame 11, vertical support members 14, hinged windows 16 secured to the support members by locks 21, and acoustical absorption plates 15 above and below the windows. Environmental integrity is implemented by channel members 17 around the edges of the support members and provided with chambers 18 kept at a positive pressure through inlets 19. The chambers are closed by rubber seals 20 around the edges of the windows 16.

5 Claims, 3 Drawing Figures

PROTECTIVE HOOD FOR PELLETING PRESSES

BACKGROUND OF THE INVENTION

1. Field of the Invention

This invention relates to a protective hood for tablet compressing machines which has four lateral walls with windows encircling the pelleting press, which windows are swivelable.

2. Description of the Prior Art

In order to prevent any contamination of the pressing chamber of tablet compressing machines by ambient air entering into it and also in order to prevent the emergence of dust from the tablets, it is known in the prior art to encircle the compression chamber with a housing provided with swivelable windows. The windows of these known housings merely rest loosely on their frames, however, and as a result no airtight closure is achieved. Beside loud noises from the tablet compressing machines, which operate at high pressures and speeds, it has often been found that transverse currents occur through the slits at the edges of the windows and created crosscontamination. It is therefore customary to set up these prior art machines for the production of tablets in rooms with conditioned air or in chambers, the air of which is free of foreign bodies.

SUMMARY OF THE INVENTION

It is an object of the present invention to provide a protective hood for tablet compressing machines with which the entry of air from the chamber in which the machine is set up into the operating chamber of the tablet compressing machine will be prevented, so that a conditioning of the entire operating room can be avoided, and which also prevents the emergence of sound from the operating chamber into the room where the machine is set up.

According to the invention the lateral walls of the protective hood in the area of the windows have airtight closures with profile strips in which annularly closed chambers with air exclusion channels have been disposed, which are under a positive air pressure. The consequence of this arrangement is that, in case of even a slight leak in the seal, air from the annular channel will flow either into the compression chamber or to the outside because of the positive air pressure, and as a result the penetration of ambient air into the compression chamber is prevented. In the case of filtered air, the compression chamber itself will also remain completely conditioned.

In order to preserve the necessary contact pressure of the swivelable windows against the sealing strips, it is helpful if the windows can be bolted or closed.

The delivery of the tablets produced with the tablet compressing machine preferably takes place through a side wall, for example in the form of a slide which is equipped with a ring nozzle which prevents the penetration of ambient air into the compression chamber.

The danger of the occurrence of vibrations of the protective housing which could have a disadvantageous effect on the sealing, is largely prevented through the development of the protective housing in the form of a suspended frame construction. Such a frame construction can be retrofitted to tablet compressing machines which are already in operation. For this purpose a cover plate is used which is supported by spring elements on the machine frame of the tablet compressing machine and which carries the suspended supports to which the lateral walls are attached. The cover plate should have a weight of more than 50 kg, preferably about 200 kg, in order to prevent the transmission of vibrations of the machine frame to the protective housing. Above and below the windows, the supports may include sound reduction plates, for example made of a porous plastic, which are preferably coated on at least the outside with a metal foil which is suitable for the application of color dyes.

DESCRIPTION OF THE PREFERRED EMBODIMENT

Figure 1:
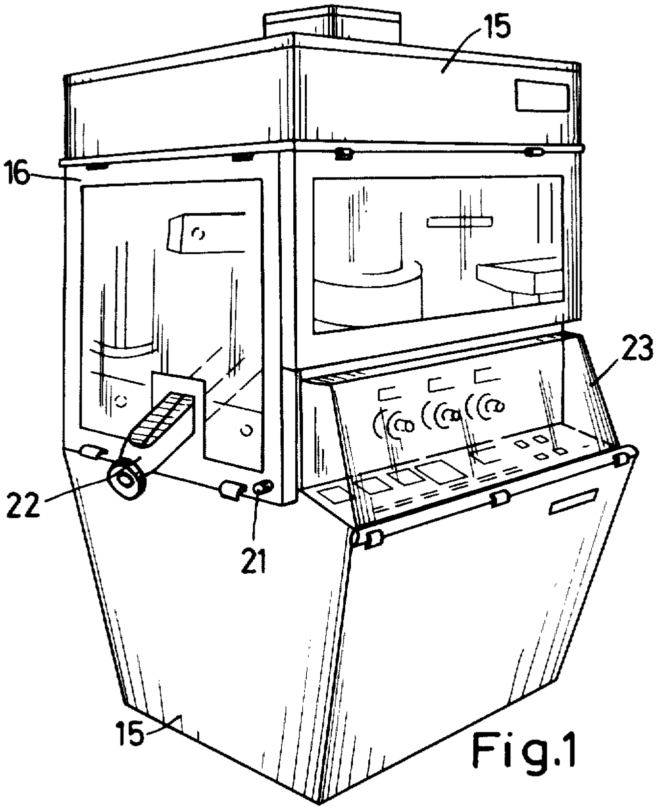
FIG. 1 shows a perspective view of a tablet compressing machine with a protective hood in accordance with the invention.

The rotary pelleting press shown in FIG. 1 is provided with a protective hood, the front wall and one lateral wall of which are visible. These two walls as well as the opposite lateral wall are always provided with a window which swivels upwards. Each window consists of a metal frame bearing a double pane. In order to obtain an airtight closure of the compression chamber lying behind it and to thereby prevent any penetration of air from the operating room into the compression chamber, annular gaskets or seals have been provided behind the windows. In addition, the upper side of the compression chamber and also its bottom are closed airtight by the use of annular gaskets 10 between the machine frame 11 and the walls of the protective housing. The introduction of filtered, clean air is accomplished from the rear of the protective hood.

The protective hood is developed as a suspended frame construction. It has a cover plate 12 with a weight of about 200 kg, which is supported on the top side of the machine frame 11 by resilient rubber elements 13. On its outside, the cover plate has supports 14 which carry the lateral walls. The supports 14 also carry sound damping plates 15 in their upper section, preferably made of a porous plastic, and also in their lower section which joins the windows 16.

Figure 2:
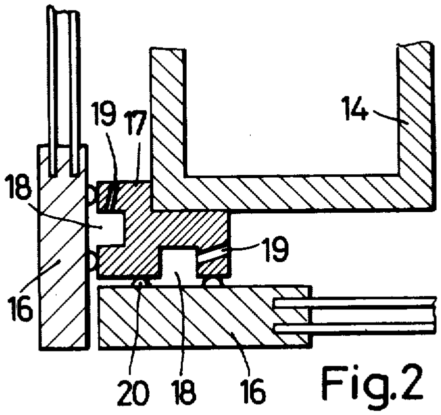
FIG. 2 shows a corner connection of two lateral walls of the protective hood in cross section.
Figure 3:
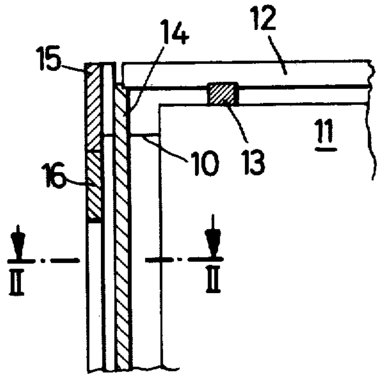
FIG. 3 shows a partial longitudinal cut through the protective hood.

As seen in FIG. 2, behind the windows 16, and between them and the supports 14, there are sealing profiles 17, made for example of aluminum, which have air channels 18. The profiles 17 enclose the rear of the windows annularly, so that closed annular channels 18 are created. The channels 18 are provided with inlets 19 for the introduction of filtered, pure air such that a slight excess pressure prevails continuously in the annular channels 18.

At the edges of the open side of the annular channels 18, the profiles 17 have additional rubber sealing gaskets 20 which prevent the escape of the filtered air from the annular channels 18. If, nevertheless, there should occur a slight leak, then filtered, clean air flows into the compression chamber exclusively by way of the annular channels 18, or such filtered, clean air flows to the outside. In any case however, by the arrangement as disclosed, ambient air from the operating room is prevented from flowing into the compression chamber.

The window frames 16 are provided with locks or bolts 21 in order to maintain a suitable contact pressure.

According to FIG. 1, the window 16 of the one lateral wall is provided with a delivery device for tablets in the manner of a slide which carries a ring nozzle which prevents the entry of ambient air into the compression chamber. The front wall of the protective hood carries a swivelable transparent hood 23 for the control panel, which likewise contributes to a complete protection against dust and sound.

We claim:

1. A tablet compressing machine comprising a plurality of lateral walls for enclosing a pelleting press and defining a protective hood, and wherein at least one of said walls includes an opening therein providing access to the hood interior, and a window hinged to said at least one wall for closing off said opening, and wherein said at least one wall comprises an airtight closure for sealing said window about said opening, the improvement wherein:

said closure comprises a profile strip defining a sealed air chamber facing said window and air connecting channels disposed within said profile strip and opening to said air chamber for subjecting said air chamber to positive air pressure, whereby, upon loss of seal between said air tight closure and said window, positive air pressure exiting from said chamber and between said window and said closure prevents contamination of the interior of said hood by the atmosphere.

2. The tablet compressing machine as defined in claim 1, wherein rubber seals extend longitudinally on each side of said chamber for said air tight closure, between the window and said closure.

3. The tablet compressing machine as defined in claim 1, wherein said machine further comprises resilient elements for supporting a cover plate and wherein said lateral walls are suspended from said cover plate by supports coupling said walls to said cover plate.

4. The tablet compressing machine as defined in claim 3, further comprising sound reduction plates mounted to said supports and extending above and below the windows.

5. The tablet compressing machine as defined in claim 4, further comprising an annular nozzle carried by one of said lateral walls to facilitate delivery of said tablets from said tablet compressing machine.

* * * * *